(12) United States Patent
Kim et al.

(10) Patent No.: US 9,100,541 B2
(45) Date of Patent: Aug. 4, 2015

(54) METHOD FOR INTERWORKING WITH DUMMY DEVICE AND ELECTRONIC DEVICE THEREOF

(71) Applicant: Samsung Electronics Co. Ltd., Suwon-si, Gyeonggi-do (KR)

(72) Inventors: Nam-Hoi Kim, Suwon-si (KR); Jin Park, Yongin-si (KR); Chan-Woo Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 13/855,263

(22) Filed: Apr. 2, 2013

(65) Prior Publication Data

US 2013/0258037 A1    Oct. 3, 2013

(30) Foreign Application Priority Data

Apr. 2, 2012  (KR) .......................... 10-2012-0033867

(51) Int. Cl.
*H04N 7/15* (2006.01)
*H04N 7/14* (2006.01)

(52) U.S. Cl.
CPC . *H04N 7/15* (2013.01); *H04N 7/141* (2013.01)

(58) Field of Classification Search
CPC ........................................................ H04N 7/15
USPC ........ 320/101, 108; 348/14.02; 370/356, 338; 375/240.02; 455/573, 456.1, 555, 41.2; 709/204, 226; 715/734; 710/303; 340/539.13; 701/532
See application file for complete search history.

(56) References Cited

U.S. PATENT DOCUMENTS

| | | | | |
|---|---|---|---|---|
| 7,504,802 | B2* | 3/2009 | Bersenev | 320/108 |
| 8,260,999 | B2* | 9/2012 | Ganesh et al. | 710/303 |
| 8,274,957 | B2* | 9/2012 | Walley et al. | 370/338 |
| 8,340,577 | B2* | 12/2012 | Griffin et al. | 455/41.2 |
| 8,626,249 | B2* | 1/2014 | Ungari et al. | 455/573 |
| 8,710,980 | B2* | 4/2014 | Herrala | 340/539.13 |
| 8,805,399 | B2* | 8/2014 | Shmunis | 455/456.1 |
| 2004/0093380 | A1* | 5/2004 | Sellen et al. | 709/204 |
| 2007/0036154 | A1* | 2/2007 | Lipman | 370/356 |
| 2007/0114967 | A1* | 5/2007 | Peng | 320/101 |
| 2007/0265769 | A1* | 11/2007 | Geelen et al. | 701/200 |
| 2010/0169935 | A1 | 7/2010 | Abbruzzese | |
| 2011/0231884 | A1 | 9/2011 | Shmueli et al. | |
| 2012/0036441 | A1* | 2/2012 | Basir et al. | 715/734 |
| 2012/0110187 | A1* | 5/2012 | Hawkins | 709/226 |
| 2012/0183039 | A1* | 7/2012 | Rajamani et al. | 375/240.02 |
| 2013/0225235 | A1* | 8/2013 | Elter et al. | 455/555 |
| 2013/0258037 | A1* | 10/2013 | Kim et al. | 348/14.02 |
| 2014/0122607 | A1* | 5/2014 | Fodor et al. | 709/204 |
| 2014/0162601 | A1* | 6/2014 | Kim et al. | 455/411 |
| 2014/0199969 | A1* | 7/2014 | Johnsson et al. | 455/411 |

* cited by examiner

*Primary Examiner* — Gerlad Gauthier
(74) *Attorney, Agent, or Firm* — Jefferson IP Law, LLP

(57) ABSTRACT

An operation method of an electronic device that is operable with a dummy device is provided. The method includes operating the dummy device through a physical coupling to the electronic device, establishing, by the electronic device, a wireless connection with the dummy device if a call is received by the electronic device, and operating the electronic device with the dummy device through the wireless connection.

24 Claims, 9 Drawing Sheets

METHOD FOR INTERWORKING WITH DUMMY DEVICE AND ELECTRONIC DEVICE THEREOF

PRIORITY

This application claims the benefit under 35 U.S.C. §119(a) of a Korean patent application filed on Apr. 2, 2012 in the Korean Intellectual Property Office and assigned Serial No. 10-2012-0033867, the entire disclosure of which is hereby incorporated by reference.

BACKGROUND OF THE INVENTION

1. Field of the Invention

The present invention relates to an electronic device capable of interworking with a dummy device.

2. Description of the Related Art

Portable terminals are widely used by consumers due to a rapid increase of supply rates and because of convenience of services provided by portable terminals. As the performance of the portable terminals is improved, high-performance portable terminals which are called smart phones are being more commonly used.

In order to meet various consumers' needs, smart phones have sizes similar to those of related art cellular phones and portable electronic devices of various sizes, such as a tablet Personal Computer (PC) having a larger screen, and the like, are under development. Recently, performance of the smart phones has improved by employing a multi-core processor, a quad-core processor and other similar advanced computing technologies. The smart phone having a relatively small screen causes an inconvenience when viewing a video, performing multitasking, and other similar uses of the smart phone, owing to screen size and battery capacity. In contrast, the tablet PC having a relatively large screen allows for more convenient application utilization, but has poor portability and may cause an inconvenience upon executing a voice call due to the large size of the tablet PC.

In order to address the disadvantages caused by the aforementioned device size, a scheme of coupling a small-size smart phone with a dummy device providing a larger screen size and a greater battery capacity is taken into consideration. That is, the dummy device has the larger screen size and the greater battery capacity compared to the smart phone and, when the dummy device is coupled with the smart phone, the dummy device operates like hardware of the smart phone. That is, a user may run an application of the smart phone through hardware of the dummy device. Accordingly, by coupling the smart phone with the dummy device, the user may use the smart phone in more pleasant circumstances. Therefore, a more efficient interworking procedure between an electronic device, such as the smart phone, and the dummy device is needed.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above problems and/or disadvantages and to provide at least the advantages below. Accordingly, an aspect of the present invention is to provide a method for increasing the utilization of a dummy device, and an electronic device thereof.

Another aspect of the present invention is to provide a method for seamless interworking between an electronic device and a dummy device, and the electronic device thereof.

Another aspect of the present invention is to provide a method for establishing a wireless connection between an electronic device and a dummy device when the electronic device is decoupled from the dummy device, and the electronic device thereof.

The above aspects are addressed by providing a method for interworking with a dummy device, and an electronic device thereof.

According to an aspect of the present invention, an operation method of an electronic device that is operable with a dummy device is provided. The method includes operating the dummy device through a physical coupling to the electronic device, establishing, by the electronic device, a wireless connection with the dummy device if a call is received by the electronic device, and operating the electronic device with the dummy device through the wireless connection.

According to another aspect of the present invention, an operation method of a dummy device that is operable with an electronic device is provided. The method includes establishing, by the dummy device, a wireless connection with the electronic device during a physical coupling of the dummy device with the electronic device, and operating the dummy device with the electronic device through the wireless connection.

According to a further aspect of the present invention, an electronic device that is operable with a dummy device is provided. The electronic device includes at least one processor executing computer programs, a memory storing data and instructions, and at least one module stored in the memory and configured to be executed by the at least one processor. The at least one module includes an instruction for operating the dummy device through a physical coupling to the electronic device, an instruction for establishing, by the electronic device, a wireless connection with the dummy device if a call is received by the electronic device, and an instruction for controlling the electronic device with the dummy device through the wireless connection.

According to yet another aspect of the present invention, a dummy device that is operable with an electronic device is provided. The dummy device includes at least one processor executing computer programs, a memory storing data and instructions, and at least one module stored in the memory and configured to be executed by the at least one processor. The at least one module includes an instruction for establishing, by the dummy device, a wireless connection with the electronic device during a physical coupling of the dummy device with the electronic device, and an instruction for controlling the dummy device with the electronic device through the wireless connection.

According to still another aspect of the present invention, a non-transitory computer-readable storage medium storing one or more programs is provided. The non-transitory computer-readable storage medium storing one or more programs includes instructions for, when the programs are executed by an electronic device, enabling the electronic device to perform the aforementioned method.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to an electronic device and a method for increasing the utilization of a dummy device, and the electronic device thereof by providing seamless interworking between the electronic device and the dummy device. The exemplary embodiments described below relate to a technology for increasing the utilization of a dummy device connectable with an electronic device. In the present exemplary embodiments, the electronic device may be a portable electronic device, a smart phone, a portable terminal, a mobile phone, a mobile pad, a media player, a tablet computer, a handheld computer, or a Personal Digital Assistant (PDA). Also, the electronic device may be a device having a combination of two or more functions among these devices. However, the present invention is not limited thereto, and the electronic device may be any suitable and/or similar electronic device that may be connected to another electronic device that is similar to the dummy device.

The dummy device may also be any one of the electronic devices discussed above. However, in the present exemplary embodiments, the dummy device refers to a device supporting and/or providing a hardware resource to another electronic device, such as any of the electronic devices discussed above, when it is coupled with the other electronic device. Therefore, in the descriptions of the present exemplary embodiments, a term of 'dummy device' may be used in order to distinguish the dummy device from the electronic device.

Figure 1:
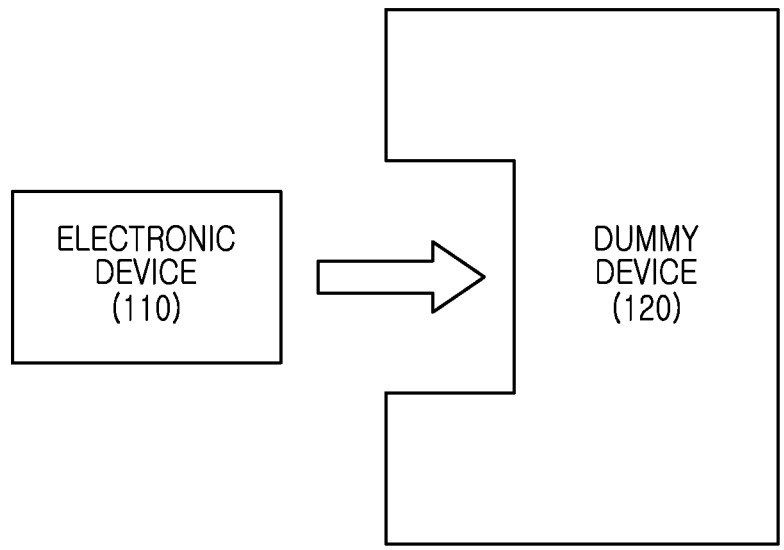
FIG. 1 is a diagram illustrating an electronic device and a dummy device according to an exemplary embodiment of the present invention.

FIG. 1 illustrates an electronic device and a dummy device according to an exemplary embodiment of the present invention.

Referring to FIG. 1, an electronic device 110 can be coupled with a dummy device 120. The electronic device 110 may provide a computing function and a communication function, and may include constituent elements such as a memory, a sensor and any other similar and/or suitable constituent elements, items, and/or units that may be included in the electronic device 110. The electronic device 110 includes a User Interface (UI) unit, such as a display unit, a touchscreen or any suitable and/or similar screen, for physically displaying a UI to a user of the electronic device 110, an audio output unit, an input unit, and the like. The dummy device 120 includes an output means, an input means, a battery, a memory, and any other similar and/or suitable constituent elements, items, and/or units that may be included in the electronic device 110. Also, the dummy device 120 has an external port for coupling with the electronic device 110. For example, according to an exemplary embodiment of the present invention, the dummy device 120 may have a wireless interface capable of establishing wireless connection with the electronic device 110.

In a state where the electronic device 110 and the dummy device 120 are coupled with each other, a UI provided in the dummy device 120 may be used for an application executed in the electronic device 110. For instance, in the state where the electronic device 110 and the dummy device 120 are coupled with each other, if a user plays a video by using the electronic device 110, the video may be displayed through a display unit of the dummy device 120. Also, in the state where the electronic device 110 and the dummy device 120 are coupled with each other, if the user inputs an instruction using the input unit of the dummy device 120, the electronic device 110 may perform an operation corresponding to the instruction inputted to the input unit of the dummy device 120. Also, the electronic device 110 may have access to the memory of the dummy device 120, and may receive power supplied from the dummy device 120. The electronic device 110 may charge a battery of the electronic device 110 by using the power supplied from the dummy device 120, or may consume the power supplied from the dummy device 120 for operation rather than using the battery of the electronic device 110. In the present exemplary embodiment, and in the description provided herein below, a state where the electronic device 110 and the dummy device 120 are operated like one device after being coupled is called an 'interworking state'.

Particularly, according to an exemplary embodiment of the present invention, if the electronic device 110 and the dummy device 120 are physically decoupled from or not coupled to each other while still in the interworking state, the electronic device 110 and the dummy device 120 may establish a wireless connection, and maintain the interworking state by using the wireless connection between the electronic device 110 and the dummy device 120. That is, despite the physical decoupling or lack of physical coupling, the electronic device 110 may use an output unit of the dummy device 120. By this, a service provided in the interworking state due to the physical coupling may be done seamlessly.

Figure 2:
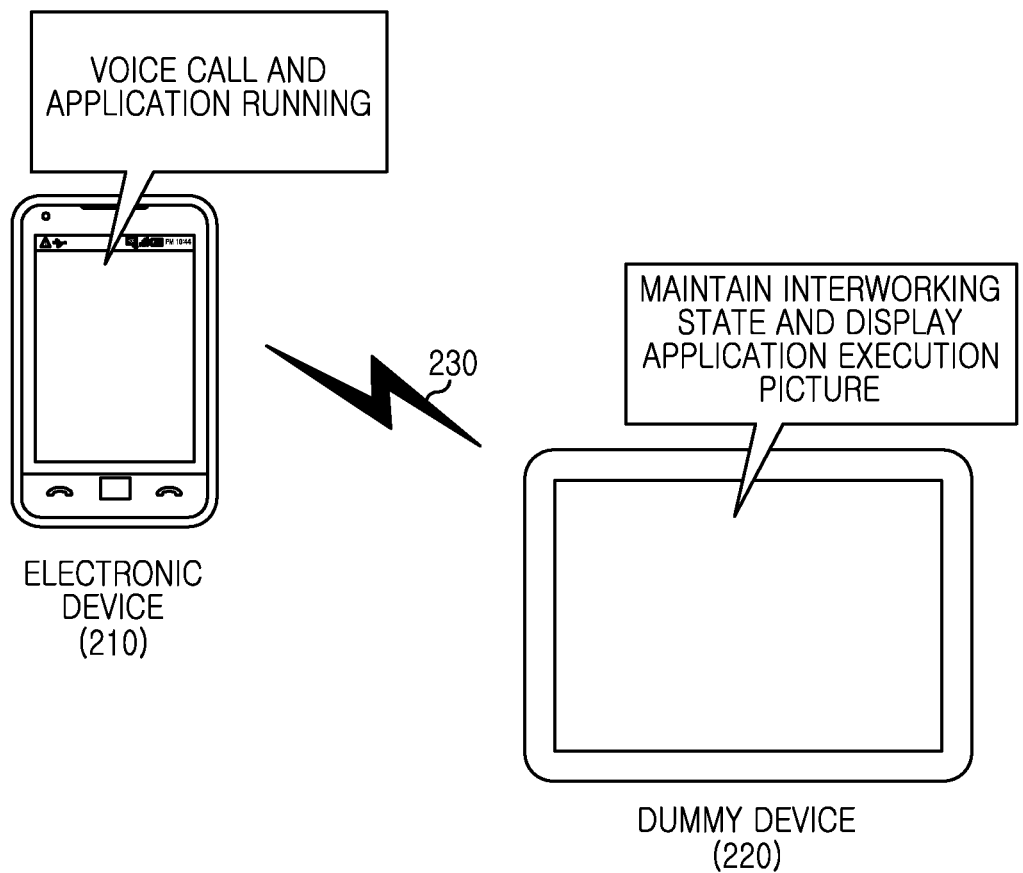
FIG. 2 is a diagram illustrating an interworking state between an electronic device and a dummy device according to a first exemplary embodiment of the present invention.

FIG. 2 illustrates an interworking state between an electronic device and a dummy device according to the first exemplary embodiment of the present invention.

Referring to FIG. 2, an exemplary embodiment of performing a voice call during interworking based on physical coupling. Although not shown in FIG. 2, in the exemplary embodiment of FIG. 2, the electronic device 210 and the dummy device 220 are physically coupled with each other and then enter an interworking state. In order to enter the interworking state, the electronic device 210 and the dummy device 220 exchange information about a hardware capability. After that, according to a user's manipulation, the electronic device 210 executes an application and/or operation, such as playing a movie, web browsing, or any other similar and/or suitable application and/or operation, and output the application through an output unit, such as a display unit, a speaker, or any other type of output unit for outputting information to a user, provided in the dummy device 220. At this time, the electronic device 210 may charge its battery by using power provided from the dummy device 220.

In the case of a voice call received by the electronic device 210 during the application execution, when the voice call is incoming, the electronic device 210 and the dummy device 220 form a wireless connection 230 between them. For example, the wireless connection 230 may be formed based on Wireless Fidelity (WiFi), Bluetooth, or any other similar and/or suitable Radio Frequency (RF) communication system. In a case of using the WiFi, the wireless connection 230 may be formed through a separate Access Point (AP) or a direct link between the electronic device 210 and the dummy device 220 may be established using a WiFi-Direct (WiFi-D) technology.

Next, if the physical coupling between the electronic device 210 and the dummy device 220 is ended by a user, or in other words, if the electronic device 210 and the dummy device 220 are physically decoupled from each other, the electronic device 210 and the dummy device 220 maintain the interworking state through the wireless connection 230. Accordingly, the electronic device 210 may continue the execution of the application, and the dummy device 220 may display a picture of the application through the output unit of the dummy device 220. That is, the electronic device 210 may transmit output data for the application to the dummy device 220 through the wireless connection 230, and the dummy device 220 may transmit input data for the application to the electronic device 210 through the wireless connection 230. Concurrently, the electronic device 210 may provide a voice call service by using hardware provided in the electronic device 210.

If the voice call is executed in a state where the electronic device 210 and the dummy device 220 are not decoupled from each other, for instance, if a user executes the voice call by using a headset, a speakerphone function, and the like, while not decoupling the electronic device 210 from the dummy device 220, the electronic device 210 and the dummy device 220 may release the wireless connection 230 because the physical coupling is kept. Also, when the electronic device 210 and the dummy device 220 are maintaining the interworking state through the wireless connection 230, if the electronic device 210 and the dummy device 220 are again physically coupled with each other, then the electronic device 210 and the dummy device 220 release the wireless connection 230, and maintain the interworking state through the physical coupling.

Figure 3:
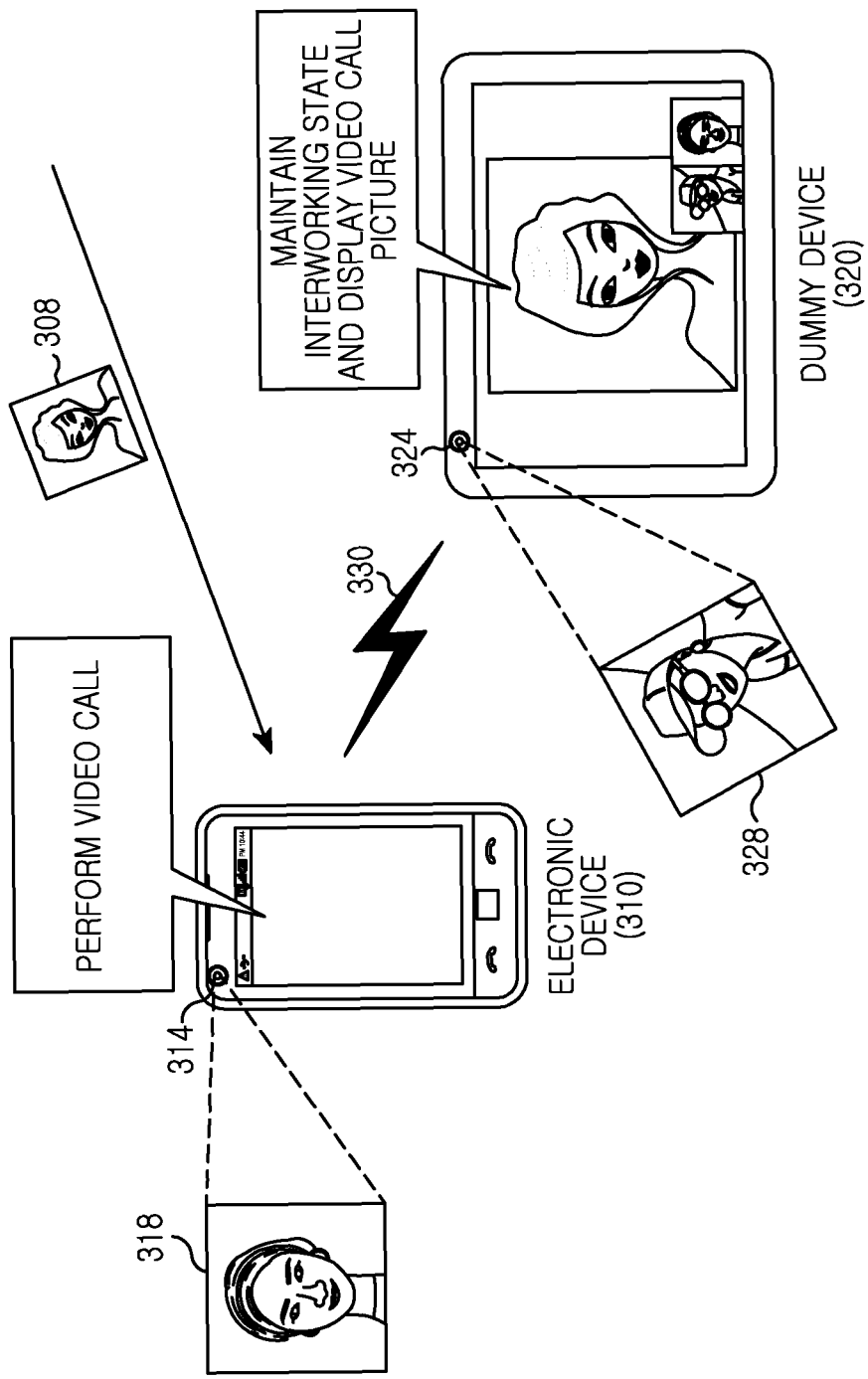
FIG. 3 is a diagram illustrating an interworking state between an electronic device and a dummy device according to a second exemplary embodiment of the present invention.

FIG. 3 illustrates an interworking state between an electronic device and a dummy device according to the second exemplary embodiment of the present invention.

Referring to FIG. 3, an exemplary embodiment of performing a video call during interworking based on physical coupling is illustrated. An electronic device 310 and a dummy device 320 are physically coupled with each other so as to enter an interworking state. In order to enter the interworking state, the electronic device 310 and the dummy device 320 may exchange information about a hardware capability. After that, according to user's manipulation, the electronic device 310 executes an application and outputs the application through an output unit provided in the dummy device 320. At this time, the electronic device 310 may charge its battery by using power provided from the dummy device 320.

In a case where a video call is received by the electronic device 310 during the application execution, if the video call is incoming, then the electronic device 310 and the dummy device 320 may form a wireless connection 330 between them. The wireless connection 330 may be formed according to the same manner as the wireless connection 230 of FIG. 2. Next, if the physical coupling between the electronic device 310 and the dummy device 320 is ended by the user, or in other words, if the electronic device 310 and the dummy device 320 are physically decoupled from each other, then the electronic device 310 and the dummy device 320 may maintain the interworking state through the wireless connection 330. While maintaining the interworking state, the electronic device 310 may discontinue the execution of the application, and the dummy device 320 may display a picture of the video call through the output means. That is, the electronic device 310 may transmit output data for the video call to the dummy device 320 through the wireless connection 330. At this time, the output data for the video call may include at least one of a picture 308 transmitted by a video-call called party, a picture 318 recorded through a camera 314 provided in the electronic device 310, and a picture 328 recorded through a camera 324 provided in the dummy device 320, or any other similar and/or suitable output data for a video call including audio and visual data. Also, when a video call related instruction is input through the dummy device 320, the dummy device 320 may transmit the video call related instruction to the electronic device 310 through the wireless connection 330.

If the video call is implemented in a state where the electronic device 310 and the dummy device 320 are not decoupled from each other, then the electronic device 310 and the dummy device 320 may release the wireless connection 330 because the physical coupling is maintained. Also, when the electronic device 310 and the dummy device 320 are maintaining the interworking state through the wireless connection 330, if the electronic device 310 and the dummy device 320 are again physically coupled with each other, then the electronic device 310 and the dummy device 320 may release the wireless connection 330 and maintain the interworking state through the physical coupling. At this time, if the video call is ended, the electronic device 310 may again execute the application discontinued due to the video call.

Figure 4:
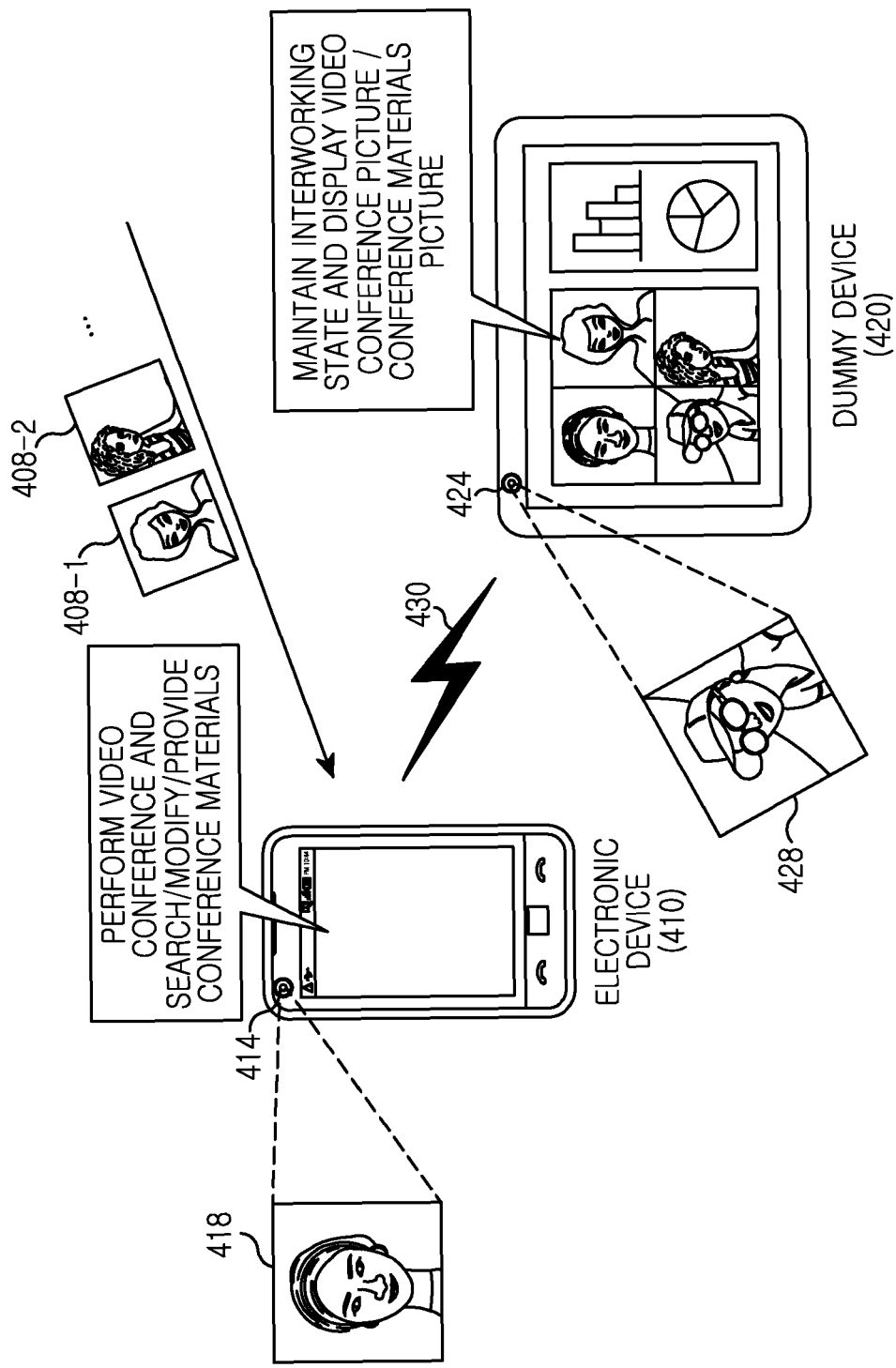
FIG. 4 is a diagram illustrating an interworking state between an electronic device and a dummy device according to a third exemplary embodiment of the present invention.

FIG. 4 illustrates an interworking state between an electronic device and a dummy device according to the third exemplary embodiment of the present invention.

Referring to FIG. 4, an exemplary embodiment of performing a video conference during interworking based on physical coupling is illustrated. An electronic device 410 and a dummy device 420 are physically coupled with each other and then enter an interworking state. In order to enter the interworking state, the electronic device 410 and the dummy device 420 may exchange information about a hardware capability. After that, according to user's manipulation, the electronic device 410 executes an application and outputs the application through an output unit provided in the dummy device 420. At this time, the electronic device 410 may charge its battery by using power provided from the dummy device 420.

In a case where a video conference is to be joined by the electronic device 410 during the application execution, if the video conference is incoming, then the electronic device 410 and the dummy device 420 form a wireless connection 430 between them, wherein the wireless connection 430 may be similar to the wireless connection 230 of FIG. 2. Next, if the physical coupling between the electronic device 410 and the dummy device 420 is ended by a user, or in other words, if the electronic device 410 and the dummy device 420 are physically decoupled from each other, then the electronic device 410 and the dummy device 420 may maintain the interworking state through the wireless connection 430. Accordingly, the electronic device 410 discontinues the execution of the application, and the dummy device 420 displays a picture of the video conference through the output unit. That is, the electronic device 410 may transmit output data for the video conference to the dummy device 420 through the wireless connection 430. At this time, the output data for the video conference may include at least one of pictures 408-1 and 408-2 transmitted by video conference participants, a picture 418 recorded through a camera 414 provided in the electronic device 410, a picture 428 recorded through a camera 424 provided in the dummy device 420, and a picture (not shown) of conference materials, or any other similar and or suitable output data that may be included in the video conference. Additionally, the electronic device 410 may be used as an interface for controlling the video conference. Therefore, a user may update the picture of conference materials or modify the conference materials through the electronic device 410. That is, the electronic device 410 may function as an input unit or device for the video conference, and the dummy device 420 may function as an output unit or device for the video conference.

If the video conference is executed while in a state where the electronic device 410 and the dummy device 420 are not decoupled from each other, then the electronic device 410 and the dummy device 420 may release the wireless connection 430 because the physical coupling is kept. Also, when the electronic device 410 and the dummy device 420 are maintaining the interworking state through the wireless connection 430, if the electronic device 410 and the dummy device 420 are again physically coupled with each other, then the electronic device 410 and the dummy device 420 may release the wireless connection 430 and maintain the interworking state through the physical coupling. At this time, if the video conference is ended, the electronic device 410 may again execute the application that was discontinued due to the video conference.

Figure 5:
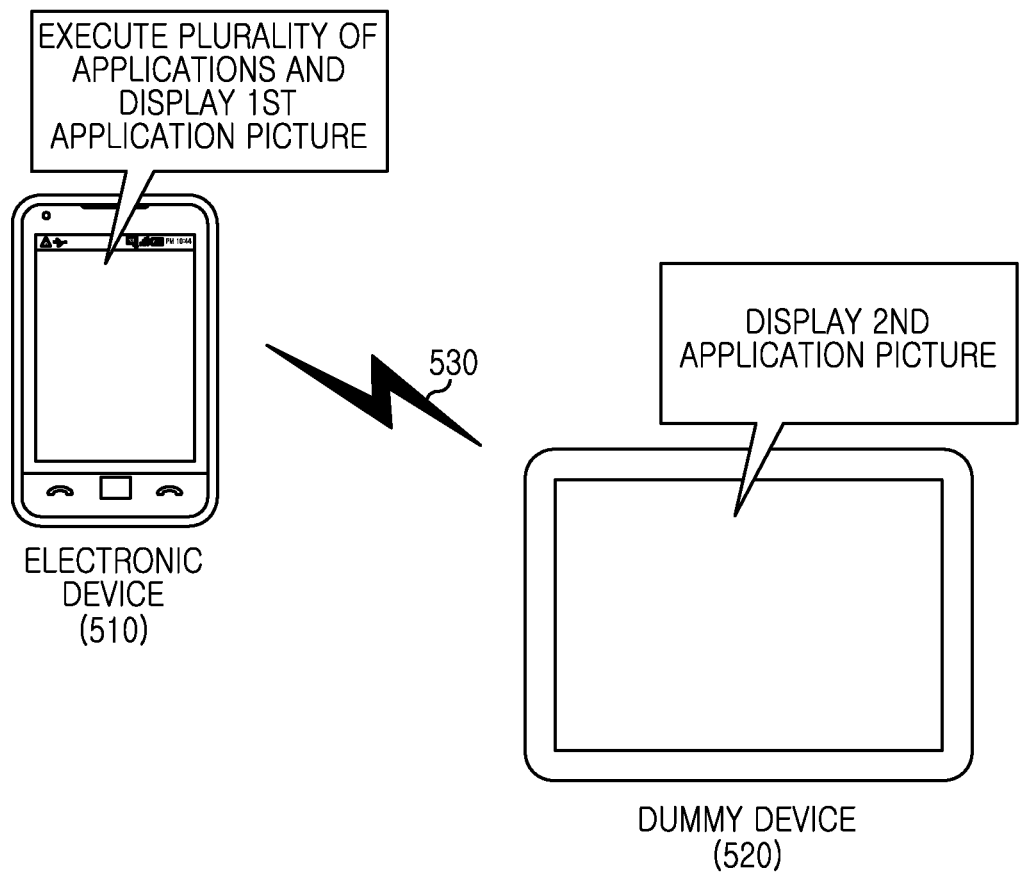
FIG. 5 is a diagram illustrating an interworking state between an electronic device and a dummy device according to a fourth exemplary embodiment of the present invention.

FIG. 5 illustrates an interworking state between an electronic device and a dummy device according to the fourth exemplary embodiment of the present invention.

Referring to FIG. 5, an exemplary embodiment of performing multitasking in an interworking state based on wireless connection. An electronic device 510 and a dummy device 520 activate respective wireless interfaces and then form a wireless connection 530 without physical coupling, wherein the wireless connection 530 may be similar to the wireless connection 230 of FIG. 2.

After that, the electronic device 510 may execute two different applications. Accordingly, the electronic device 510 may output and control a first application through hardware provided in the electronic device 510, and may output and control a second application through hardware provided in the dummy device 520. That is, the electronic device 510 transmits output data for the second application to the dummy device 520 through the wireless connection 530, and the dummy device 520 transmits input data generated for the second application to the electronic device 510.

For example, a first user may execute the first application by using an input means of the electronic device 510, and a second user may execute the second application by using an input means of the dummy device 520. In such a case, from the viewpoint of the first user and the second user, the first application may be viewed as being executed by the electronic device 510 and the second application may be viewed as being executed by the dummy device 520.

Figure 6:
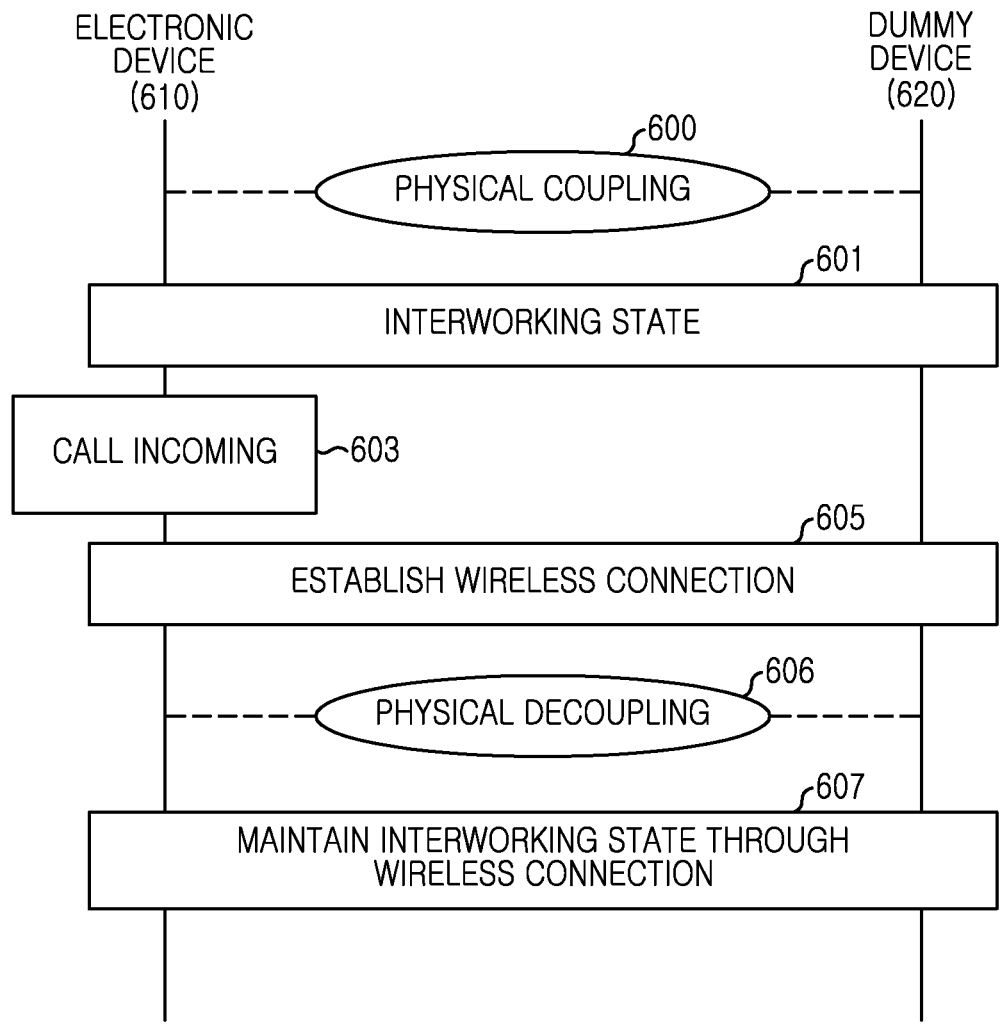
FIG. 6 is a flowchart illustrating a procedure of operation between an electronic device and a dummy device according to an exemplary embodiment of the present invention.

FIG. 6 illustrates a procedure of operation between an electronic device and a dummy device according to an exemplary embodiment of the present invention.

Referring to FIG. 6, an electronic device 610 and a dummy device 620 are physically coupled to each other by a user in step 600. Accordingly, in step 601, the electronic device 610 and the dummy device 620 enter a mutual interworking state. In order to enter the interworking state in step 601, the electronic device 610 and the dummy device 620 may exchange information about a hardware capability. The electronic device 610 may use hardware of the dummy device 620 during the interworking state. Furthermore, the dummy device 620 may provide power to the electronic device 610 during the interworking state. At this time, the electronic device 610 may charge its battery by using power provided from the dummy device 620 or may consume the power supplied from the dummy device 620 for operation rather than using power supplied by its battery.

After that, in step 603, a call is incoming to the electronic device 610. Here, the call may be a voice call, a video call, a video conference or any other similar and or suitable type of call connection that may be received by the electronic device 610. If the call is incoming, the electronic device 610 establishes wireless connection with the dummy device 620 in step 605. A wireless protocol for the wireless connection may be one of WiFi, WiFi-D, and Bluetooth or any other similar and/or suitable type of RF communication system.

Next, the electronic device 610 and the dummy device 620 are physically decoupled from each other by the user in step 606. After the physical decoupling in step 606, the electronic device 610 and the dummy device 620 maintain the interworking state through the wireless connection in step 607. In other words, the electronic device 610 senses the physical decoupling from the dummy device 620 after receiving the incoming call, and changes a medium for the interworking state into the wireless connection. Accordingly, a service provided in the interworking state before the physical decoupling may be provided seamlessly and continuously. Additionally, when executing an application corresponding to the call, the electronic device 610 may use hardware provided in the dummy device 620 as well as hardware provided in the electronic device 610, together to execute the application corresponding to the call.

For example, in a case where the electronic device 610 receives a video call, the electronic device 610 may transmit all of a video inputted to a camera of the electronic device 610 and a video inputted to a camera of the dummy device 620 to a called party, and may output a video received from the called party through a display unit of the dummy device 620. According to another case where the electronic device 610 is to join a video conference, the dummy device 620 may transmit all of a video inputted to the camera of the electronic device 610 and a video inputted to at least one of cameras of the dummy device 620 to at least one called party, and may output a video received from the at least one called party through the display unit of the dummy device 620. Furthermore, in the case of joining the video conference, the electronic device 610 may process a video conference related instruction inputted from a user through an input means of the electronic device 610. For example, the video conference related instruction may be at least one of a search instruction, a modification instruction, a provision instruction, and the like, for materials for the video conference, or may be any type of instruction that may be executed by the electronic device 610 during the video conference.

With respect to the present exemplary embodiment described with reference to FIG. 6, a user decouples the electronic device 610 from the dummy device 620 after the incoming call of step 603. However, the user may accept a call while not decoupling the electronic device 610 and the dummy device 620 so as to maintain a coupling state. In this case, according to another exemplary embodiment of the present invention, the electronic device 610 and the dummy device 620 may release the wireless connection, and maintain the state of step 601 so as to maintain the interworking state through the physical coupling.

Figure 7:
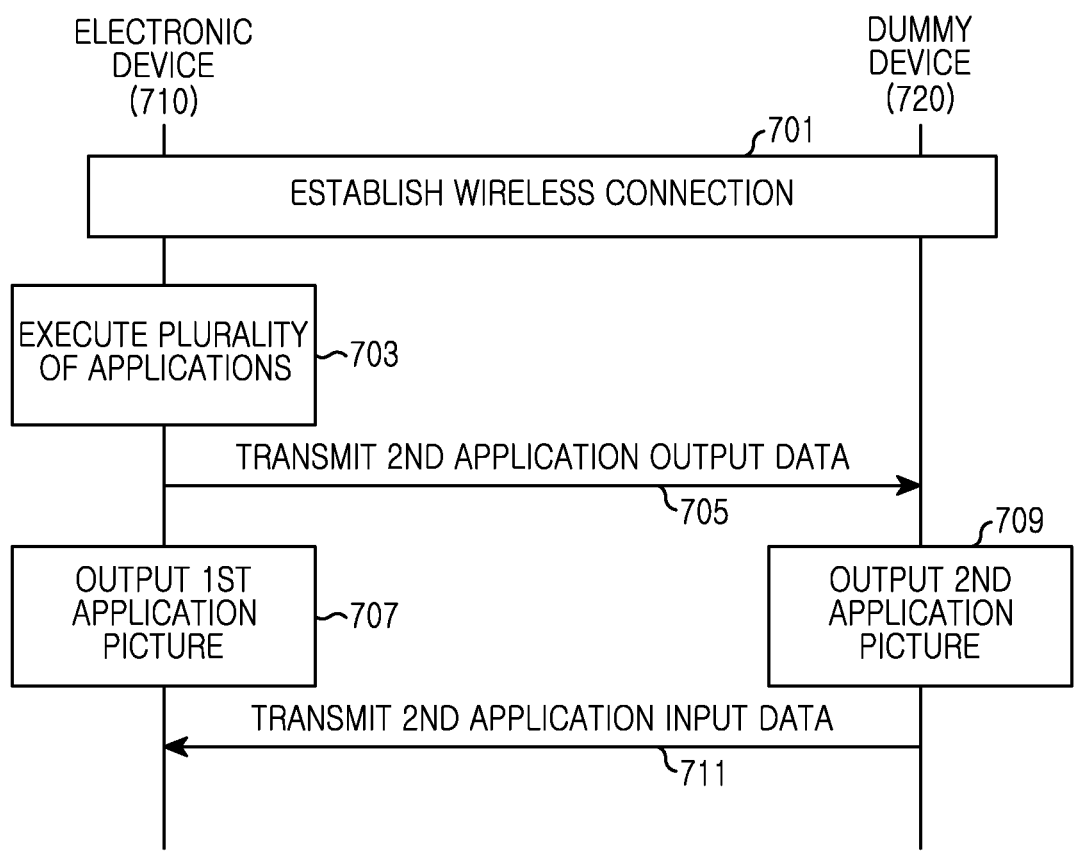
FIG. 7 is a flowchart illustrating a procedure of operation between an electronic device and a dummy device according to an exemplary embodiment of the present invention.

FIG. 7 illustrates a procedure of operation between an electronic device and a dummy device according to an exemplary embodiment of the present invention.

Referring to FIG. 7, in step 701, an electronic device 710 establishes wireless connection with a dummy device 720. A wireless protocol for the wireless connection of the present exemplary embodiment may be similar to that of the exemplary embodiment of FIG. 6. Additionally, although not illustrated, the electronic device 710 and the dummy device 720 may enter an interworking state.

After step 701, in step 703, the electronic device 710 executes a plurality of applications, for instance, a first application and a second application. At this time, an execution instruction for the first application and an execution instruction for the second application may be input through an input unit of the electronic device 710. Alternately, the execution instruction for the first application may be inputted through the input unit of the electronic device 710, and the execution instruction for the second application may be inputted through an input unit of the dummy device 720.

Next, in step 705, the electronic device 710 may transmit output data for the second application to the dummy device 720. That is, as the electronic device 710 executes the first application and the second application, the output data, such as a video, an audio, and any other similar and/or suitable type of data, for the first application and the second application are generated. When the second application is being executed and the interworking state is being maintained, an operation of step 705 is repeatedly performed whenever output data for the second application is generated.

After that, in step 707, the electronic device 710 outputs a picture of the first application through a display means of the electronic device 710. In step 709, the dummy device 720 outputs a picture of the second application through a display means of the dummy device 720. That is, the electronic device 710 executes all of the first application and the second application, but a UI may be divided and performed respectively by the electronic device 710 and the dummy device 720.

Next, in step 711, the dummy device 720 transmits input data for the second application to the electronic device 710. The UI for the second application may be displayed in the dummy device 720 and therefore, an instruction for the second application may be inputted through the input unit of the dummy device 720. That is, a user may control the second application through the dummy device 720. However, the dummy device 720 may transmit input data needing processing to the electronic device 710 because the electronic device 710 executes processing corresponding to the second application. When the second application is being executed and the interworking state is being maintained, an operation of step 711 may be repeatedly performed whenever input data for the second application is generated.

The method described above in relation with FIG. 6 and FIG. 7 under of the present invention may be provided as one or more instructions in one or more software modules, or computer programs stored in an electronic device including a portable terminal.

The present invention may be implemented in an electronic device including a portable terminal such as, for example, a smart phone and a mobile telecommunication terminal Hereunder, a portable terminal is used as an example for the electronic device.

Figure 8:
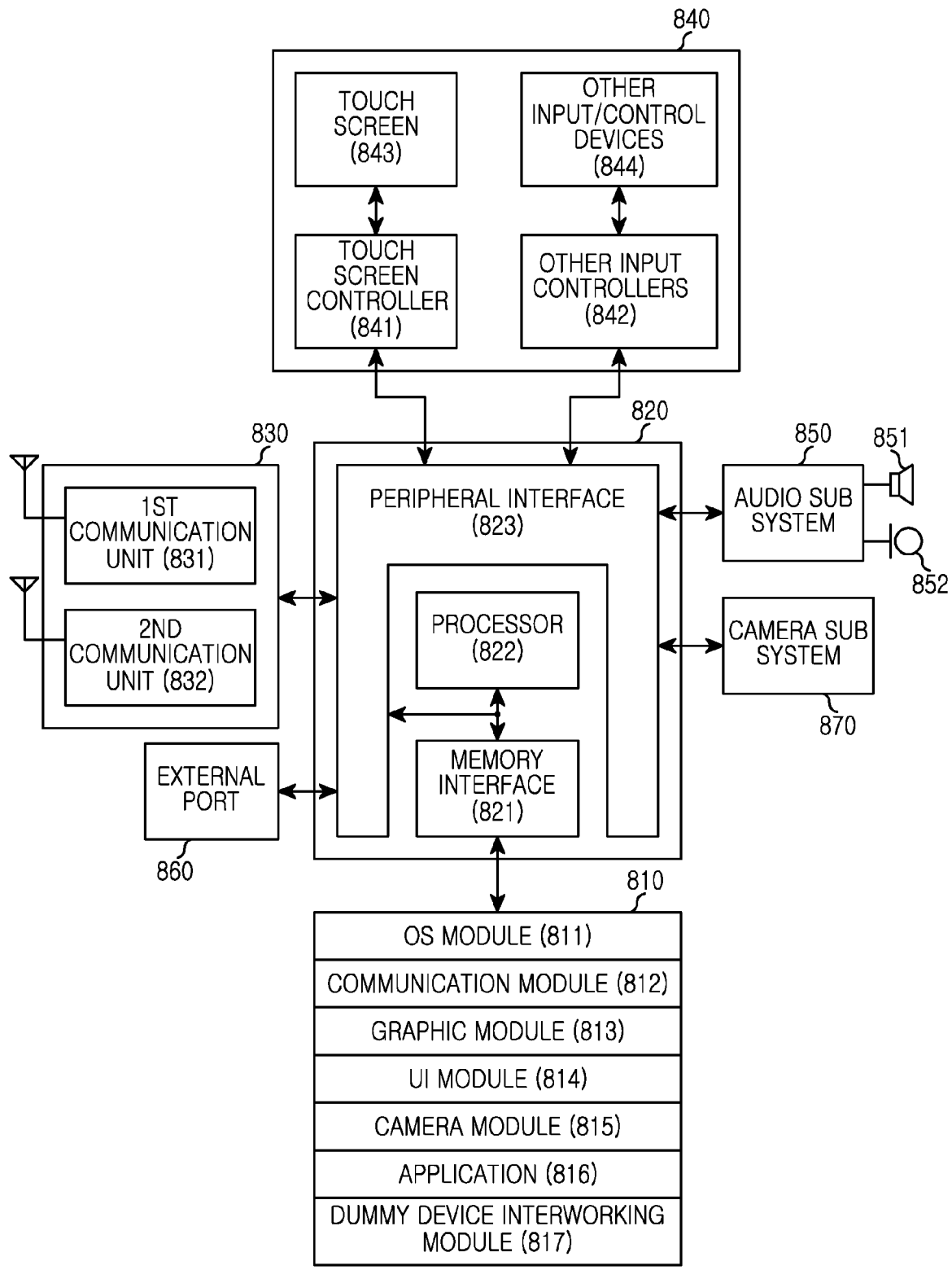
FIG. 8 is a block diagram illustrating a construction of an electronic device according to an exemplary embodiment of the present invention.

FIG. 8 is a block diagram illustrating a construction of an electronic device according to an exemplary embodiment of the present invention.

Referring to FIG. 8, an electronic device includes a memory 810, a processor unit 820, a wireless communication sub system 830, an Input Output (IO) sub system 840, an audio sub system 850, an external port 860, and a camera sub system 870. The memory 810 and the external port 860 may be constructed in plural. Constituent elements of the electronic device illustrated in FIG. 8 may be coupled with one another by at least one communication bus (not shown) or a stream line (not shown).

The memory 810 may be connected to the memory interface 821. The memory 810 may include at least one of a high-speed random access memory, such as at least one magnetic disk storage device, a non-volatile memory, at least one optical storage device, and a flash memory, such as a Not AND (NAND) memory and a Not OR (NOR) memory, or any other similar and/or suitable type of memory or storage device.

The memory 810 stores at least one software. A constituent element of the at least one software may include an Operating System (OS) module 811, a communication module 812, a graphic module 813, a UI module 814, a camera module 815, at least one application module 816 and any other similar and/or suitable type of module that may be included in software. Particularly, according to an exemplary embodiment of the present invention, the constituent element of the at least one software includes a dummy device interworking module 817. Also, a module, which is a constituent element of the software, may be expressed as a set of instructions, and the module may be also called an "instruction set" or a "program". At least one module including instructions for performing a method according to an exemplary embodiment of the present invention may be stored in the memory 810.

The OS module 811 may include at least one software constituent element controlling a general system operation. For example, the OS module 811 may be a built-in operating system such as WINDOWS, LINUX, Darwin, Real-Time Executive in C (RTXC), UNIX, OS X, and VxWorks, or any other similar and/or suitable type of OS. For instance, control of the general system operation may include memory management and control, storage hardware control and management, power control and management and the like. The OS module 811 may perform a function of executing communications between at least one hardware and at least one software constituent element.

The communication module 812 includes at least one software constituent element for performing communication with other electronic devices, such as a personal computer, a server, a portable terminal and any other similar and/or suitable electronic device, through the wireless communication sub system 830, the external port 860 and any other similar and/or suitable element of the electronic device of the present exemplary embodiment. The graphic module 813 includes at least one software constituent element for providing and displaying a graphic on the touch screen 843. Herein, the term 'graphic' may refer to a text, a web page, an icon, a digital image, a video, an animation or any other similar and/or suitable item or element that may be displayed on a display unit.

The UI module 814 includes at least one software constituent element associated with a UI. Furthermore, matters associated with the UI include information about how a state of the UI is changed or in which conditions the change of the state of the UI is carried out, and the like. The camera module 815 includes at least one software constituent element for performing camera-related processes and functions. The application module 816 includes at least one application program. For example, the application program may be a browser, an electronic mail (e-mail), an instant message, word processing, keyboard emulation, an address book, a touch list, a widget, Digital Rights Management (DRM), voice recognition, voice replication, a position determining function, a location-based service and any other similar and/or suitable application that may be executed on the electronic device.

The dummy device interworking module 817 includes at least one software constituent element for interworking with a dummy device. For example, the dummy device interworking module 817 may include a software constituent element for recognizing physical connection with the dummy device, a software constituent element for entering an interworking state with the dummy device, a software constituent element for using hardware of the dummy device, and any other similar and/or suitable software constituent element. According to an exemplary embodiment of the present invention, the dummy device interworking module 817 may further include at least one software constituent element for realizing a function described with reference to FIGS. 2 to 7. In detail, the dummy device interworking module 817 may include a software constituent element for, upon receiving an incoming call, establishing the wireless connection in the interworking state with the dummy device, and a software constituent element for maintaining the interworking state through the wireless connection.

In detail, the dummy device interworking module 817 may include an instruction for sensing physical decoupling of the electronic device from the dummy device after the incoming call is received, and changing a medium for the interworking state into the wireless connection. Also, the dummy device interworking module 817 may include an instruction, if the call is accepted in a state where physical coupling with the dummy device is maintained, for releasing the wireless connection. Also, the dummy device interworking module 817 may include an instruction for transmitting output data for an application executed in the interworking state through the physical coupling, to the dummy device through the wireless connection. Also, the dummy device interworking module 817 may include an instruction for transmitting output data including a video call picture to the dummy device through the wireless connection.

Also, the dummy device interworking module 817 may include an instruction for controlling the electronic device as an input unit for a video conference, and controlling the dummy device as an output unit for the video conference. According to an exemplary embodiment of the present invention, some or all of functions carried out by the dummy device interworking module 817 may be carried out by a hardware device. In such a case, the hardware device may be constructed as a part of a processor 822.

The memory 810 may include an additional module besides the aforementioned modules 811 to 817. Additionally, some of the aforementioned modules 811 to 817 may be excluded according to another exemplary embodiment of the present invention.

The processor unit 820 may include a memory interface 821, a processor 822, and a peripheral interface 823. The processor 822 may include at least one hardware chip. Also, the whole of the processor unit 820 may be referred to as a 'processor'. The memory interface 821, the processor 822, and the peripheral interface 823 may each be an individual constituent element or be included in at least one integrated circuit.

By executing a software program, the processor 822 allows the electronic device to perform a function corresponding to the software program, and performs processing and control for voice communication and data communication. Also, by executing a software module stored in the memory 810, the processor 822 performs a function corresponding to the software module. The software module may be called an "instruction set". That is, the processor 822 interworks with the software modules stored in the memory 810 to carry out a method of an exemplary embodiment of the present invention. The processor 822 may include at least one data processor and image processor. The data processor and the image processor may be constructed as separate hardware. Also, the processor 822 may be constructed as a plurality of processors performing different functions.

The peripheral interface 823 connects the IO sub system 840 of the electronic device, and at least one peripheral device thereof, to the processor 822 and the memory 810. The memory 810 may be connected through the memory interface 821. That is, the memory interface 821 provides an interface for accessing the memory 810.

The wireless communication sub system 830 provides an interface for wireless communication. The wireless communication sub system 830 can include at least one of a RF receiver and/or transmitter and an optical receiver and/or transmitter such as an infrared receiver and/or transmitter. The wireless communication sub system 830 may include a first communication unit 831 and a second communication unit 832 following different standards. The first communication unit 831 and the second communication unit 832 may be distinguished according to a communication network in which the electronic device communicates. For example, the communication network may be at least one of, although not limited to, a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a WiFi network, a Wireless interoperability for Microwave Access (WiMAX) network, a Bluetooth network, or any other similar and/or suitable type of communication network or communication system. The first communication unit 831 and the second communication unit 832 may be coupled as one block. For example, the first communication unit 831 may provide an interface for accessing a wireless communication system. According to an exemplary embodiment of the present invention, the second communication unit 832 may provide an interface for a wireless connection with the dummy device. For example, the second communication unit 832 may follow a wireless protocol such as WiFi, WiFi-D, Bluetooth and the like.

The IO sub system 840 may include a touch screen controller 841, other input controllers 842, a touch screen 843, and other input/control devices 844. The touch screen controller 841 may be coupled to the touch screen 843. The touch screen 843 and the touch screen controller 841 may detect a contact, a motion, and an interruption of the contact or the motion by using, although not limited to, capacitive, resistive, infrared and surface acoustic wave technologies, or any other similar and/or suitable methods and technologies for determining at least one contact point on the touch screen 843 and may also a multi-touch sensing technology including other proximity sensor arrays or other elements.

The other input controllers 842 may be coupled to the other input/control devices 844. The other input/control devices 844 may include at least one up/down button for volume control. Also, the button may have a form of a push button or rocker button, a rocker switch, a thumb-wheel, a dial, a stick, a pointer device such as a stylus and any other similar and/or suitable form or element.

The touch screen 843 provides an input/output interface between the electronic device and a user. That is, the touch screen 843 may forward a user's touch input to the electronic device. Also, the touch screen 843 may be a medium for showing an output of the electronic device to the user. That is, the touch screen 843 provides a visual output to the user. This visual output may be expressed in a form of a text, a graphic, a video, and a combination thereof. Various display means may be used for the touch screen 843. For example, the touch screen 843 may include at least one of, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED) or any other similar and/or suitable type of display.

The audio sub system 850 is coupled to a speaker 851 and a microphone 852, and performs input and output of an audio stream or signal for operations such as voice recognition, voice replication, digital recording, and call function. That is, the audio sub system 850 communicates with a user through the speaker 851 and the microphone 852. The audio sub system 850 receives a data stream through the peripheral interface 823 of the processor unit 820, and converts the received data stream into an electric signal. The converted electric signal is forwarded to the speaker 851. The speaker 851 converts the electric signal into human-audible sound waves and outputs the converted sound waves. The microphone 852 converts sound waves forwarded from human or other sound sources, into electric signals. The audio sub system 850 receives the electric signals from the microphone 852. The audio sub system 850 converts the electric signals into audio data streams, and transmits the converted audio data streams to the peripheral interface 823. The audio sub system 850 may include a detachable earphone, headphone or headset, or may include a terminal for connecting the earphone, the headphone, the headset and the like.

The external port 860 provides a physical connection for directly connecting the electronic device to other electronic devices or indirectly connecting the electronic device to other electronic devices over a network. For example, the network may be the Internet, an intranet, a Wireless Local Area Network (WLAN) and the like. For example, the external port 860 may be, although not limited to, a Universal Serial Bus (USB) port, a FIREWIRE port, a Local Area Network (LAN) port, a phone port and any other similar and/or suitable interface. According to an exemplary embodiment of the present invention, the external port 860 may be used for physical connection with the dummy device. Also, the external port 860 may be used for receiving power supply from the dummy device. That is, the external port 860 may include a connection unit for data exchange (not shown) with the dummy device and a connection unit for power supply (not shown).

The camera sub system 870 may perform a function of photo taking, video recording and the like. The camera sub system 870 may include an optical sensor, a lens and the like. That is, the camera sub system 870 recognizes, by the optical sensor, light inputted through the lens, and makes an image recognized in the optical sensor, into digital data.

Various functions of the electronic device according to the present exemplary embodiment may be executed by hardware including at least one stream processing and Application Specific Integrated Circuit (ASIC) or any other similar and/or suitable hardware element, software, and a combination of them.

Figure 9:
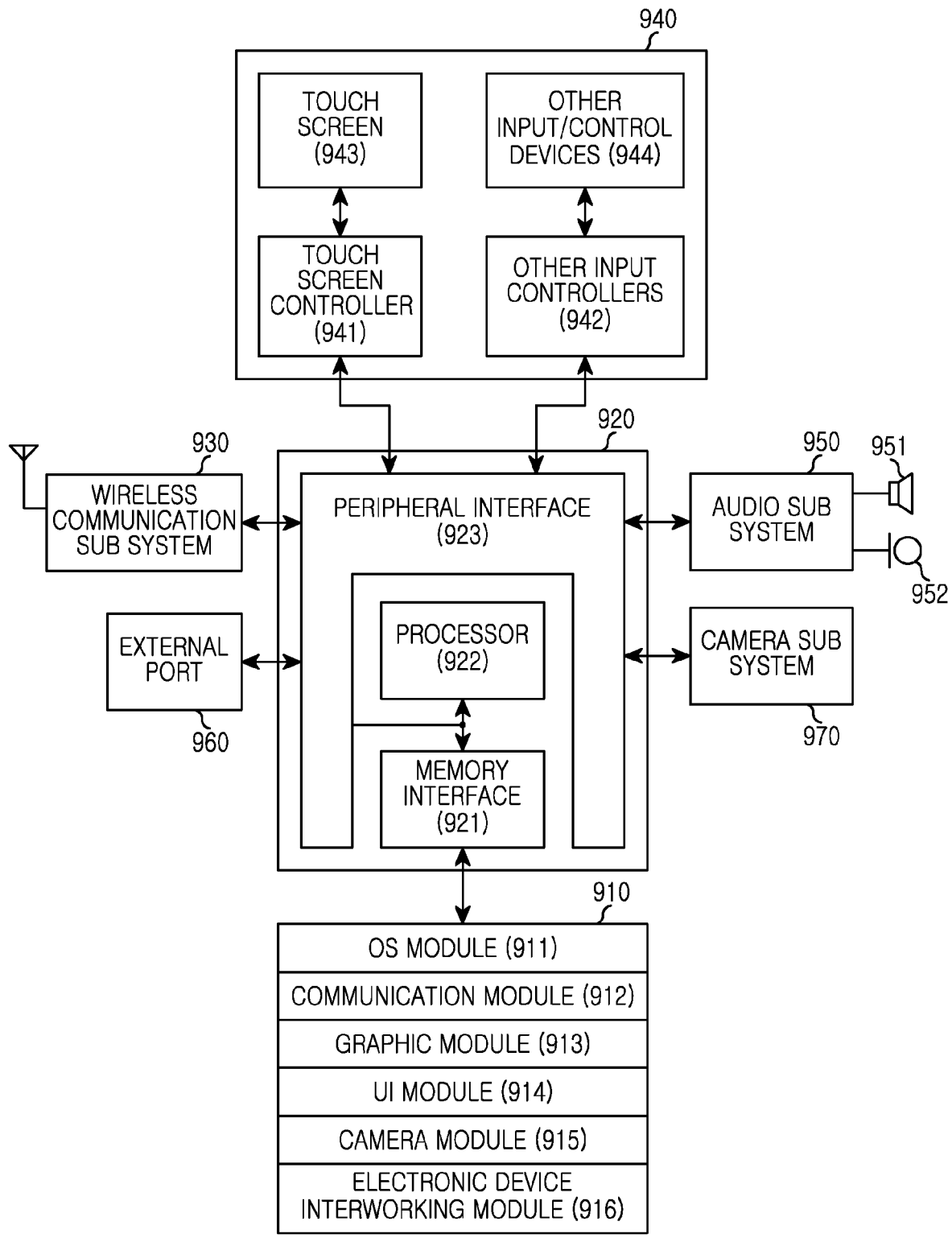
FIG. 9 is a block diagram illustrating a construction of a dummy device according to an exemplary embodiment of the present invention.

FIG. 9 is a block diagram illustrating a construction of a dummy device according to an exemplary embodiment of the present invention.

Referring to FIG. 9, the dummy device includes a memory 910, a processor unit 920, a wireless communication sub system 930, an IO sub system 940, an audio sub system 950, an external port 960, and a camera sub system 970. The memory 910 and the external port 960 may be constructed in plural. Constituent elements of the dummy device illustrated in FIG. 9 may be coupled with one another by at least one communication bus (not shown) or stream line (not shown).

The memory 910 may be connected to the memory interface 921. The memory 910 may include at least one of a high-speed random access memory, such as at least one magnetic disk storage device, a non-volatile memory, at least one optical storage device, a flash memory, such as a NAND memory and a NOR memory, and any other similar and/or suitable type of memory and/or storage device.

The memory 910 stores at least one software. A constituent element of the at least one software may include an OS module 911, a communication module 912, a graphic module 913, a UI module 914, a camera module 915 and any other similar and/or suitable constituent element of software. Particularly, according to an exemplary embodiment of the present invention, the constituent element of the at least one software includes an electronic device interworking module 916. Also, a module, which is the constituent element of the software, may be expressed as a set of instructions, and the module may be also called an "instruction set" or a "program". At least one module including instructions performing a method according to an exemplary embodiment of the present invention may be stored in the memory 910.

The OS module 911 includes at least one software constituent element controlling a general system operation. For example, the OS module 911 may be a built-in operating system such as WINDOWS, LINUX, Darwin, RTXC, UNIX, OS X, and VxWorks or any other similar and/or similar OS. For instance, control of the general system operation includes memory management and control, storage hardware control and management, power control and management and the like. The OS module 911 performs communication between at least one hardware element and at least one software constituent element.

The communication module 912 includes at least one software constituent element for performing communication with other electronic devices, such as a personal computer, a server, a portable terminal and the like, through the wireless communication sub system 930, the external port 960 and any other suitable and/or similar element of the dummy device. The graphic module 913 includes at least one software constituent element for providing and displaying a graphic on the touch screen 943. The UI module 914 includes at least one software constituent element associated with a UI. Furthermore, matters associated with the UI include information about how a state of the UI is changed or in which conditions the change of the state of the UI is carried out, and the like. The camera module 915 includes at least one software constituent element for performing camera-related processes and functions.

The electronic device interworking module 916 includes at least one software constituent element for interworking with an electronic device. For example, the electronic device interworking module 916 may include a software constituent element for recognizing physical connection with the electronic device, and a software constituent element for entering an interworking state with the electronic device. According to an exemplary embodiment of the present invention, the electronic device interworking module 916 may further include at least one software constituent element for realizing a function described with reference to FIGS. 2 to 7. In detail, the electronic device interworking module 916 may include an instruction for establishing wireless connection with the electronic device, and an instruction for maintaining the interworking state through the wireless connection. In detail, the electronic device interworking module 916 may include an instruction for controlling the wireless communication sub system 930 to receive output data for an application executed in the interworking state through the physical coupling, from the electronic device through the wireless connection. Also, the electronic device interworking module 916 may include an instruction for controlling the wireless communication sub system 930 to receive output data including one of a video call picture and a video conference picture from the electronic device through the wireless connection. Also, the electronic device interworking module 916 may include an instruction for controlling the wireless communication sub system 930 to transmit a video inputted through a camera, to the electronic device through the wireless connection. According to an exemplary embodiment of the present invention, some or all of functions carried out by the electronic device interworking module 916 may be carried out by a hardware device. In this case, the hardware device may be constructed as a part of a processor 922.

The memory 910 may include an additional module besides the aforementioned modules 911 to 916. Additionally, some of the aforementioned modules 911 to 916 may be excluded according to another exemplary embodiment of the present invention.

The processor unit 920 may include a memory interface 921, a processor 922, and a peripheral interface 923. The processor 922 may include at least one hardware chip. The whole of the processor unit 920 may be also called a 'processor'. The memory interface 921, the processor 922, and the peripheral interface 923 each may be an individual constituent element or may be included in at least one integrated circuit.

By executing a software program, the processor 922 allows the dummy device to perform a function corresponding to the software program, and performs processing and control for voice communication and data communication. Also, by executing a software module stored in the memory 910, the processor 922 performs a specific function corresponding to the software module. The software module may be called an "instruction set". That is, the processor 922 interworks with the software modules stored in the memory 910 to carry out a method of an exemplary embodiment of the present invention. The processor 922 may include at least one data processor and image processor. The data processor and the image processor may be constructed as separate hardware. Also, the processor 922 may be constructed as a plurality of processors performing different functions.

The peripheral interface 923 connects the IO sub system 940 of the dummy device and at least one peripheral device, to the processor 922 and the memory 910. The memory 910 may be connected through the memory interface 921. That is, the memory interface 921 provides an interface for accessing the memory 910.

The wireless communication sub system 930 provides an interface for wireless communication. The wireless communication sub system 930 may include at least one of an RF receiver and/or transmitter and an optical receiver and/or transmitter, such as an infrared receiver and/or transmitter. According to an exemplary embodiment of the present invention, the wireless communication sub system 930 may provide an interface for wireless connection with the electronic device. For example, the wireless communication sub system 930 may follow a wireless protocol such as WiFi, WiFi-D, Bluetooth, and any other similar and/or suitable wireless protocol.

The IO sub system 940 may include a touch screen controller 941, other input controllers 942, a touch screen 943, and other input/control devices 944. The touch screen controller 941 may be coupled to the touch screen 943. The touch screen 943 and the touch screen controller 941 may detect a contact, a motion, and an interruption of the contact or the motion by using capacitive, resistive, infrared and surface acoustic wave technologies for determining at least one contact point on the touch screen 943 and also a multi-touch sensing technology including other proximity sensor arrays or other elements or any other similar and/or suitable element and/or technology for touch sensing.

The other input controllers 942 may be coupled to the other input/control devices 944. The other input/control devices 944 may include at least one up/down button for volume control. Also, the button may have a form of a push button or rocker button, a rocker switch, a thumb-wheel, a dial, a stick, a pointer device such as a stylus or any other similar and/or suitable form.

The touch screen 943 provides an input/output interface between the dummy device and a user. That is, the touch screen 943 may forward a user's touch input to the dummy device. Also, the touch screen 943 is a medium for showing an output from the dummy device to the user. That is, the touch screen 943 provides a visual output to the user. This visual output may be expressed in a form of a text, a graphic, a video, or any other similar and/or suitable form, and a combination thereof. Various display units or types may be used for the touch screen 943. For example, the touch screen 943 may be at least one of, although not limited to, an LCD, an LED, an LPD, an OLED, an AMOLED, an FLED or any other similar and/or suitable type of display.

The audio sub system 950 is coupled to a speaker 951 and a microphone 952, and inputs and outputs an audio stream or signal and performs operations such as voice recognition, voice replication, digital recording, and call function. That is, the audio sub system 950 communicates with a user through the speaker 951 and the microphone 952. The audio sub system 950 receives a data stream through the peripheral interface 923 of the processor unit 920, and converts the received data stream into an electric signal. The converted electric signal is forwarded to the speaker 951. The speaker 951 converts the electric signal into human-audible sound waves and outputs the converted sound waves. The microphone 952 converts the sound waves forwarded from human or other sound sources into electric signals. The audio sub system 950 receives the electric signals from the microphone 952. The audio sub system 950 converts the electric signals into audio data streams, and transmits the converted audio data streams to the peripheral interface 923. The audio sub system 950 may include a detachable earphone, headphone or headset, or include a terminal for connecting the earphone, the headphone, the headset and the like.

The external port 960 provides a physical connection for directly connecting the dummy device to other electronic devices or indirectly connecting the dummy device to other electronic devices over a network. For example, the network may be the Internet, an intranet, a WLAN and the like. For example, the external port 960 may be, although not limited to, a USB port, a FIREWIRE port, a LAN port, a phone port and any other similar and/or suitable type of port. According to an exemplary embodiment of the present invention, the external port 960 may be used for physical connection with the electronic device. Also, the external port 960 may be used for receiving power supply from the electronic device. That is, the external port 960 includes a connection unit for data exchange with the electronic device, and a connection unit for power supply.

The camera sub system 970 may perform a function of photo taking, video recording and the like. The camera sub system 970 may include an optical sensor, a lens and the like. That is, the camera sub system 970 recognizes, by the optical sensor, light inputted through the lens, and makes an image recognized in the optical sensor, into digital data.

Various functions of the dummy device, according to the present exemplary embodiment, may be executed by hardware including at least one stream processing and ASIC or any other similar and/or suitable hardware element, software, and a combination of them.

Methods according to exemplary embodiments disclosed herein may be implemented in a form of hardware, software, or a combination of hardware and software.

In a case of implementing the exemplary embodiments in the software form, a non-transitory computer readable storage medium storing one or more programs and/or software modules may be provided. One or more programs stored in the non-transitory computer readable storage medium are configured to be executable by one or more processors within an electronic device. One or more programs include instructions for enabling the electronic device to execute the methods according to the exemplary embodiments disclosed in the claims of the present invention and/or the specification thereof.

These programs, including software modules or software, may be stored in a Random Access Memory (RAM), a non-volatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Or, the programs may be stored in a memory configured by a combination of some or all of them. Also, each configuration memory may be included in plural.

Furthermore, the programs may be stored in an attachable storage device accessible to the electronic device through a communication network such as the Internet, an intranet, a LAN, a WLAN, a Storage Area Network (SAN), or a communication network configured by a combination of them. This storage device may access the electronic device through an external port.

Furthermore, a separate storage device included a communication network may access the portable electronic device.

By maintaining an interworking state through a wireless connection, even when a physical decoupling has occurred, in a wireless communication system, exemplary embodiments of the present invention may provide more stable and more various services through a dummy device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of an electronic device that is operable with a dummy device, the method comprising:
    operating the dummy device through a physical coupling to the electronic device;
    establishing a wireless connection between the electronic device and the dummy device;
    sensing a physical decoupling of the electronic device from the dummy device; and
    operating the electronic device with the dummy device through the wireless connection.

2. The method of claim 1,
    wherein the operating of the electronic device with the dummy device through the wireless connection comprises changing a medium for an interworking state into the wireless connection, and
    wherein the interworking state is determined according to a coupling of the electronic device to the dummy device.

3. The method of claim 1, further comprising releasing the wireless connection if a call is accepted in a state where the physical coupling of the electronic device with the dummy device is maintained.

4. The method of claim 1, further comprising:
    receiving a call after operating the dummy device through a physical coupling to the electronic device,
    wherein the call is at least one of a voice call, a video call, and a video conference.

5. The method of claim 1, wherein the operating of the electronic device with the dummy device through the wireless connection comprises transmitting output data for an application, the application being executed in an interworking state through the physical coupling, to the dummy device through the wireless connection.

6. The method of claim 1, wherein the operating of the electronic device with the dummy device through the wireless connection comprises transmitting output data, the output data including a video call picture to the dummy device through the wireless connection.

7. The method of claim 1, wherein the operating of the electronic device with the dummy device through the wireless connection comprises:
   controlling the electronic device as an input unit for a video conference; and
   controlling the dummy device as an output unit for the video conference.

8. A non-transitory computer-readable storage medium storing one or more programs comprising instructions for, when the programs are executed by an electronic device, enabling the electronic device to perform a method of claim 1.

9. An operation method of a dummy device that is operable with an electronic device, the method comprising:
   establishing a wireless connection between the dummy device and the electronic device during a physical coupling of the dummy device with the electronic device;
   sensing a physical decoupling of the dummy device from the electronic device; and
   operating the dummy device with the electronic device through the wireless connection.

10. The method of claim 9, wherein the operating of the dummy device with the electronic device through the wireless connection comprises receiving output data, the output data being for an application executed in an interworking state through the physical coupling, from the electronic device through the wireless connection.

11. The method of claim 9, wherein the operating of the dummy device with the electronic device through the wireless connection comprises receiving output data, the output data including at least one of a video call picture and a video conference picture, from the electronic device through the wireless connection.

12. The method of claim 9, wherein the operating of the dummy device with the electronic device through the wireless connection comprises transmitting a video, the video being inputted through a camera, to the electronic device through the wireless connection.

13. A non-transitory computer-readable storage medium storing one or more programs comprising instructions for, when the programs are executed by an electronic device, enabling the electronic device to perform a method of claim 9.

14. An electronic device that is operable with a dummy device, the electronic device comprising:
   at least one processor configured to execute computer programs;
   a memory configured to store data and instructions; and
   at least one module stored in the memory and configured to be executed by the at least one processor,
   wherein the at least one module comprises:
      an instruction for operating the dummy device through a physical coupling to the electronic device,
      an instruction for establishing a wireless connection between the electronic device and the dummy device,
      an instruction for sensing a physical decoupling of the electronic device from the dummy device, and
      an instruction for controlling the electronic device with the dummy device through the wireless connection.

15. The electronic device of claim 14,
   wherein the at least one module comprises an instruction for changing a communication medium for an interworking state into the wireless connection, and
   wherein the interworking state is determined according to a coupling of the electronic device to the dummy device.

16. The electronic device of claim 14, wherein the at least one module comprises an instruction for releasing the wireless connection if a call is accepted in a state where the physical coupling of the electronic device with the dummy device is maintained.

17. The electronic device of claim 14, wherein the at least one module comprises an instruction for receiving a call after operating the dummy device through a physical coupling to the electronic device, and wherein the call is at least one of a voice call, a video call, and a video conference.

18. The electronic device of claim 14, wherein the module comprises an instruction for transmitting output data for an application, the application being executed in an interworking state through the physical coupling, to the dummy device through the wireless connection.

19. The electronic device of claim 14, wherein the module comprises an instruction for transmitting output data, the output data including a video call picture, to the dummy device through the wireless connection.

20. The electronic device of claim 14, wherein the module comprises an instruction for controlling the electronic device as an input unit for a video conference, and controlling the dummy device as an output unit for the video conference.

21. A dummy device that is operable with an electronic device, the dummy device comprising:
   at least one processor configured to execute computer programs;
   a memory configured to store data and instructions; and
   at least one module stored in the memory and configured to be executed by the at least one processor,
   wherein the at least one module comprises:
      an instruction for establishing a wireless connection between the dummy device and the electronic device during a physical coupling of the dummy device with the electronic device, an instruction for sensing a physical decoupling of the electronic device from the dummy device, and
      an instruction for controlling the dummy device with the electronic device through the wireless connection.

22. The dummy device of claim 21, further comprising a communication unit configured to receive output data, the output data being for an application executed in an interworking state through the physical coupling, from the electronic device through the wireless connection.

23. The dummy device of claim 21, further comprising a communication unit configured to receive output data, the output data including at least one of a video call picture and a video conference picture, from the electronic device through the wireless connection.

24. The dummy device of claim 21, further comprising a communication unit configured to transmit a video, the video being inputted through a camera, to the electronic device through the wireless connection.

* * * * *